United States Patent
Gorman et al.

(10) Patent No.: US 6,422,022 B2
(45) Date of Patent: Jul. 23, 2002

(54) APPARATUS AND METHODS FOR SUPPLYING AUXILIARY STEAM IN A COMBINED CYCLE SYSTEM

(75) Inventors: William G. Gorman; William George Carberg, both of Ballston Spa; Charles Michael Jones, Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 09/905,982

(22) Filed: Jul. 17, 2001

Related U.S. Application Data

(63) Continuation of application No. 09/640,667, filed on Aug. 18, 2000, now abandoned, which is a continuation of application No. 09/213,253, filed on Dec. 17, 1998, now abandoned.

(51) Int. Cl.[7] ............................. F02C 6/18; F02C 7/12; F02C 7/16

(52) U.S. Cl. ..................... 60/771; 60/39.182; 60/806; 122/7 B

(58) Field of Search ............................. 60/771, 39.182, 60/806; 122/7 R, 7 B

(56) References Cited

U.S. PATENT DOCUMENTS

| | | | | |
|---|---|---|---|---|
| 4,391,101 A | * | 7/1983 | Labbe et al. | 60/646 |
| 5,428,950 A | * | 7/1995 | Tomlinson et al. | 60/39.02 |
| 5,471,832 A | * | 12/1995 | Sugita et al. | 60/39.141 |
| 5,577,377 A | * | 11/1996 | Tomlinson | 60/39.02 |
| 5,979,156 A | * | 11/1999 | Uematsu et al. | 60/39.141 |
| 6,000,213 A | * | 12/1999 | Ohtomo et al. | 60/39.182 |
| 6,286,297 B1 | * | 9/2001 | Wakazono et al. | 60/39.182 |

OTHER PUBLICATIONS

"39th GE Turbine State–of–the–Art Technology Seminar", Tab 1, ""F" Technology—the First Half–Million Operating Hours", H.E. Miller, Aug. 1996.

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hz 170–MW Class Gas Turbine", A. S. Arrao, Aug. 1996.

"39th GE Turbine State–of–the–Art Technology Seminar", Tab 4, "MWS6001FA—An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

(List continued on next page.)

Primary Examiner—Ted Kim
(74) Attorney, Agent, or Firm—Nixon & Vanderhye PC

(57) ABSTRACT

To provide auxiliary steam, a low pressure valve is opened in a combined cycle system to divert low pressure steam from the heat recovery steam generator to a header for supplying steam to a second combined cycle's steam turbine seals, sparging devices and cooling steam for the steam turbine if the steam turbine and gas turbine lie on a common shaft with the generator. Cooling steam is supplied the gas turbine in the combined cycle system from the high pressure steam turbine. Spent gas turbine cooling steam may augment the low pressure steam supplied to the header by opening a high pressure valve whereby high and low pressure steam flows are combined. An attemperator is used to reduce the temperature of the combined steam in response to auxiliary steam flows above a predetermined flow and a steam header temperature above a predetermined temperature. The auxiliary steam may be used to start additional combined cycle units or to provide a host unit with steam turbine cooling and sealing steam during full-speed no-load operation after a load rejection.

12 Claims, 1 Drawing Sheet

OTHER PUBLICATIONS

"39th GE Turbine State–of–the–Art Technology Seminar", Tab 6, "GE Aeroderivative Gas Turbines—Design and Operating Features", M.W. Horner, Aug. 1996.

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_X$ Combustion Systems for GE Heavy-Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines,"J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Tubrine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2– Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validats High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995–Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3–13, Oct., 1995.

"Proceedings of the Advanced Turbine Systems Annual Program Review Meeting", vol. I, "H Gas Turbine Combined Cycle", J. Corman, p. 14–21, Oct., 1995.

"Proceedings of the Advanced Turbine Systems Annual Program Review Meeting", vol. I, "Overview of Westinghouse's Advanced Turbine Systems Program", Bannister et al., p. 22–30, Oct., 1995.

"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting", vol. I, "Advanced Turbine Systems Program Industrial System Concept Development", S. Gates, p. 43–63, Oct., 1995.

"Proceedings of the Advanced Turbine Systems Annual Program Review Meeting", vol. I, "Advanced Turbine System Program Phase 2 Cycle Selection", Latcovich, Jr., p. 64–69, Oct., 1995.

"Proceedings of the Advanced Turbine Systems Annual Program Review Meeting", vol. I, "General Electric ATS Program Technical Review Phase 2 Activities", Chance et al., p. 70–74, Oct., 1995.

"Proceedings of the Advanced Turbine Systems Annual Program Review Meeting", vol. I, "Technical Review of Westinghouse's Advanced Turbine Systems Program", Diakunchak et al., p. 75–86, Oct., 1995.

"Proceedings of the Advanced Turbine Systems Annual Program Review Meeting", vol. I, "Advanced Combustion Turbines and Cycles: An EPRI Perspective", Touchton et al., p. 87–88, Oct., 1995.

"Proceedings of the Advanced Turbine Systems Annual Program Review Meeting", vol. I, "Advanced Turbine Systems Annual Program Review", William E. Koop, p. 89–92, Oct., 1995.

"Proceedings of the Advanced Turbine Systems Annual Program Review Meeting", vol. I, "The AGTSR Consortium: An Update", Fant et al., p. 93–102, Oct., 1995.

"Proceedings of the Advanced Turbine Systems Annual Program Review Meeting", vol. I, "Overview of Allison/AGTSR Interactions", Sy A. Ali, p. 103–106, Oct., 1995.

"Proceedings of the Advanced Turbine Systems Annual Program Review Meeting", vol. I, "Design Factors for Stable Lean Premix Combustion", Richards et al., p. 107–113, Oct., 1995.

"Proceedings of the Advanced Turbine Systems Annual Program Review Meeting", vol. I, "Ceramic Stationary as Turbine", M. van Roode, p. 114–147, Oct., 1995.

"Proceedings of the Advanced Turbine Systems Annual Program Review Meeting", vol. I, "DOE/Allison Ceramic Vane Effort", Wenglarz et al., p. 148–151, Oct., 1995.

"Proceedings of the Advanced Turbine Systems Annual Program Review Meeting", vol. I, "Materials/Manufacturing Element of the Advanced Turbine Systems Program", Karnitz et al., p. 152–160, Oct., 1995.

"Proceedings of the Advanced Turbine Systems Annual Program Review Meeting", vol. I, "Land–Based Turbine Casting Initiative", Mueller et al., p. 161–170, Oct., 1995.

"Proceedings of the Advanced Turbine Systems Annual Program Review Meeting", vol. I, "Turbine Airfoil Manufacturing Technology", Kortovich, p. 171–181, Oct., 1995.

"Proceedings of the Advanced Turbine Systems Annual Program Review Meeting", vol. I, "Pratt & Whitney Thermal Barrier Coatings", Bornstein et al., p. 182–193, Oct., 1995.

"Proceedings of the Advanced Turbine Systems Annual Program Review Meeting", vol. I, "Westinhouse Thermal Barrier Coatings", Goedjen et al., p. 194–199, Oct., 1995.

"Proceedings of the Advanced Turbine Systems Annual Program Review Meeting", vol. I, "High Performance Steam Development", Duffy et al., p. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. p. 233–248, Oct., 1995.

"Proceedings of the Advanced Turbine Systems Annual Program Review Meeting", vol. II, "Lean Premixed Flames for Low $No_X$ Combustors", Sojka et al., p. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371–390, Oct., 1995.

"Proceedings of the Advanced Turbine Systems Annual Program Review Meeting", vol. II, "Rotational Effects on Turbine Blade Cooling", Govatzidakia et al., p. 391–392, Oct., 1995.

"Proceedings of the Advanced Turbine Systems Annual Program Review Meeting", vol. II, "Manifold Methods for Methane Combustion", Yang et al., p. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465–473, Oct., 1995.

"Proceedings of the Advanced Turbine Systems Annual Program Review Meeting", vol. II, Effects of Geometry on Slot–Jet Film Cooling Performance, Hyams et al., p. 474–496 Oct., 1995.

"Proceedings of the Advanced Turbine Systems Annual Program Review Meeting", vol. II, "Steam as Turbine Blade Coolant: Experimental Data Generation", Wilmsen et al., p. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., p. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, Oct., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_X$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", vol. II, "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, p. 3–16, Nov., 1996.

"Proceedings of the Advanced Turbine Systems Annual Program Review Meeting", "Power Needs in the Chemical Industry", Keith Davidson, p. 17–26, Nov., 1996.

"Proceedings of the Advanced Turbine Systems Annual Program Review Meeting", "Advanced Turbine Systems Program Overview", David Esbeck, p. 27–34, Nov., 1996.

"Proceedings of the Advanced Turbine Systems Annual Program Review Meeting", "Westinghouse's Advanced Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 49–72, Nov., 1996.

"Proceedings of the Advanced Turbine Systems Annual Program Review Meeting", "Allison Advanced Simple Cycle Gas Turbine System", William D. Weisbrod, p. 73–94, Nov., 1996.

"Proceedings of the Advanced Turbine Systems Annual Program Review Meeting", "The AGTSR Industry–University Consortium", Lawrence P. Golan, p. 95–110, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, p. 123–156, Nov., 1996.

"Proceedings of the Advanced Turbine Systems Annual Program Review Meeting", "Combustion Modeling in Advanced Gas Turbine Systems", Paul O. Hedman, p. 157–180, Nov., 19967.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", Active Control of Combustion Instabilities in Low $NO_X$ Turbines, Ben T. Zinn, p. 253–264, Nov., 1996.

"Proceedings of the Advanced Turbine Systems Annual Program Review Meeting", "Life Prediction of Advanced Materials for Gas Turbine Application," Sam Y. Zamrik, p. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461–470, Nov., 1996.

"Proceedings of the Advanced Turbine Systems Annual Program Review Meeting", "Steam as a Turbine Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov., 1996.

"Proceedings of the Advanced Turbine Systems Annual Program Review Meeting", "Closed–Loop Mist/Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthur Cohn, p. 535,–552 Nov., 1996.

"Proceedings of the Advanced Turbine Systems Annual Program Review Meeting", "ATS Materials Support", Michael Karnitz, p. 553–576, Nov., 1996.

"Proceedings of the Advanced Turbine Systems Annual Program Review Meeting", "Land Based Turbine Casting Initiative", Boyd A. Mueller, p. 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, p. 623–631, Nov., 1996.

"Proceedings of the Advanced Turbine Systems Annual Program Review Meeting", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos: DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Nos: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos: DOE/MC/31176—5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos: DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May 1, 1999, Report Nos: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos: DOE/MC/31176–07.

"Proceedings of the 1997 Advanced Turbine Systems", Annual Program Review Meeting, Oct. 28–29, 1997.

* cited by examiner

APPARATUS AND METHODS FOR SUPPLYING AUXILIARY STEAM IN A COMBINED CYCLE SYSTEM

This application is a continuation of application Ser. No. 09/640,667, filed Aug. 18, 2000, which in turn is a continuation of application Ser. No. 09/213,253, filed Dec. 17, 1998, now abandoned, the entire content of which is hereby incorporated by reference in this application.

This invention was made with Government support under Contract No. DE-FC21-95MC31176 awarded by the Department of Energy. The Government has certain rights in this invention.

TECHNICAL FIELD

The present invention relates to apparatus and methods for supplying auxiliary steam in a combined cycle system employing a gas turbine having steam cooling and particularly relates to a combined high pressure/low pressure system for extracting auxiliary steam from the combined cycle system and supplying the auxiliary steam to an end user, for example, steam seals and sparging devices for starting one or more additional combined cycle systems.

BACKGROUND OF THE INVENTION

In a typical combined cycle system, a gas turbine combusts a fuel/air mixture which expands to turn the turbine and drive a generator for the production of electricity. The hot gases of combustion exhaust into a heat recovery steam generator in which water is converted to steam in the manner of a boiler. Steam thus produced drives a steam turbine, typically comprising high, intermediate and low pressure turbines, in which additional work is extracted to drive a further load such as a second generator for producing additional electric power. In some configurations, the gas and steam turbines drive a common generator and, in others, drive different generators.

In a conventional combined cycle system where additional similar combined cycle systems are employed, auxiliary steam is often generated by a host system and applied to such second or additional systems for use during startup, for example, to provide auxiliary steam to the steam seals and sparging devices of such additional units. Auxiliary steam is typically extracted from the exhaust of the high pressure steam turbine and supplied directly to a header which, in turn, supplies auxiliary steam to the sub-systems of the additional unit(s). Auxiliary steam may also be utilized for other end purposes, for example, as process steam in co-generation applications.

Combined cycle systems also typically employ air-cooled gas turbines. The auxiliary steam conventionally extracted from the high pressure steam turbine exhaust is sufficiently cool for direct auxiliary use without attemperation. In more recent advanced design combined cycle systems, however, steam-cooled gas turbines are employed. Thus, steam from the high pressure steam turbine flows through the steam-cooling circuit of the gas turbine and the spent cooling steam is reheated for return to the steam turbine, for example, the intermediate pressure steam turbine. Low pressure steam is, of course, also supplied from the low pressure heater in the heat recovery steam generator to the steam turbine. Given the necessity of maintaining the flow of cooling steam through the gas turbine, it no longer remains practical to use steam from the high pressure steam turbine for use as auxiliary steam because to do so reduces the necessary cooling steam for the gas turbine, causing overheating and attendant problems. Consequently, the problem addressed is the provision of auxiliary steam in a combined cycle system employing a steam-cooled gas turbine.

BRIEF SUMMARY OF THE INVENTION

In accordance with an embodiment of the present invention, there is provided a combined cycle system employing a steam-cooled gas turbine wherein low pressure steam from the low pressure superheater of the heat recovery steam generator and normally supplied to the intermediate pressure steam turbine is diverted, at least in part, for flow through a first conduit by opening a pressure-responsive control valve. The diverted flow of steam flows into a header for flowing steam to another combined cycle system during startup to steam seals, for use as sparging steam, and, when applicable, steam turbine cooling steam at startup. When additional steam flow is required, spent cooling steam exhausting from the cooling circuit of the gas turbine may also be diverted in part from its return to the reheater by opening a pressure responsive high pressure control valve for flowing steam in a second conduit. These first and second steam flows are combined in a third conduit, also containing a flow nozzle for measuring the flow. A water attemperator is disposed in the third conduit and a thermocouple measures the steam temperature in the header. The attemperator is responsive to the measured flow and header steam temperature to reduce the temperature of the combined flows when the flow in the third conduit obtains a predetermined minimum flow and the header temperature exceeds a A predetermined temperature. Thus, low pressure steam from the heat recovery steam generator and high pressure spent cooling steam are combined and attemperated at a predetermined flow and header steam temperature to produce an auxiliary steam flow. The attemperator is consequently used only when a predetermined minimum steam flow and temperature have been established. The low pressure flow does not usually require attemperation and establishes the predetermined minimum flow. The valve positions and, consequently, the flow through the first and second conduits is determined by the auxiliary steam pressure in the header to which the auxiliary steam is supplied.

There are many different types of end uses for the generated auxiliary steam. For example, auxiliary steam can be used as process steam for co-generation purposes. Another use of the auxiliary steam is for starting other off-line combined cycle units. That is, in power generating stations having multiple combined cycle units, it is desirable to supply auxiliary steam from one operating unit to another unit during startup of the second unit. Auxiliary steam is necessary during startup of a second combined cycle unit, for example, for purposes of activating the steam seals, sparging the condenser and commencing delivery of cooling steam to the steam turbine when the gas turbine and steam turbine use a common generator. Otherwise, another source of steam must be utilized, for example, from an additional boiler, which may not always be available. Consequently, the auxiliary steam generated by the host unit can be supplied to a second unit header for supplying auxiliary steam to the steam seals and sparging devices and for cooling the steam turbine of the second unit, if applicable. Because the auxiliary steam temperature may be too high for use in certain devices, attemperation or temperature reduction is desirable.

It will be appreciated from the foregoing-described system that one or more additional off-line units can be started using auxiliary steam from the host unit as described and wherein the additional units may be started seriatim with short time intervals between starts. Additionally, the high pressure/low pressure system of this invention does not impact the steam-cooling requirements of the gas turbine of any one or more of the combined cycle units. This is significant because it is critically important that the steam flow for the cooling circuit in each gas turbine be maintained for proper cooling of the steam-cooled components thereof. Additional advantages of the present system include the use of low temperature steam from the LP HRSG system to establish a minimum flow level before the attemperator is used for the higher temperature supplemental steam. This minimizes the potential for water-related damage due to inadequate mixing of the steam and attemperating water. Further advantages include the use of reduced cost headers, for example, carbon steel headers instead of alloyed headers necessary for higher temperature steam. Still further, each unit is provided its own steam turbine cooling, when a common generator is used, and sealing steam during full speed no-load operation after a load rejection.

In a preferred embodiment according to the present invention, there is provided apparatus for supplying auxiliary steam to an end user comprising a combined cycle system including a steam-cooled gas turbine, a steam turbine and a heat recovery steam generator in heat transfer relation with hot products of combustion from the gas turbine, the heat recovery steam generator including a low pressure superheater for generating steam and driving the steam turbine, a reheater for flowing spent cooling steam from the gas turbine to the steam turbine, a low pressure control valve for diverting at least a portion of the low pressure steam generated by the low pressure heater for flow through a first conduit for auxiliary steam use, a high pressure control valve for diverting at least a portion of the spent high pressure cooling steam from the gas turbine for flow thereof through a second conduit, a third conduit for receiving the low pressure and high pressure steam flows of the first and second conduits, respectively, and defining an auxiliary steam conduit for flow thereof to an end user and an attemperator in the third conduit for controlling the temperature of the auxiliary steam.

In a further preferred embodiment according to the present invention, there is provided in a combined cycle system having a steam cooled gas turbine, a steam turbine and heat recovery steam generator in heat transfer relation with hot products of combustion from the gas turbine and including a heater for generating steam and driving the steam turbine, a method of generating auxiliary steam for use by an end user, comprising the steps of diverting at least a portion of the steam generated by the heater supplied to the steam turbine for flow through a first conduit, diverting at least a portion of the spent cooling steam from the gas turbine for flow through a second conduit, combining the steam flows through the first and second conduits in a third conduit for flowing auxiliary steam to an end user and reducing the temperature of the steam in the third conduit.

DETAILED DESCRIPTION OF THE INVENTION

Figure 1:
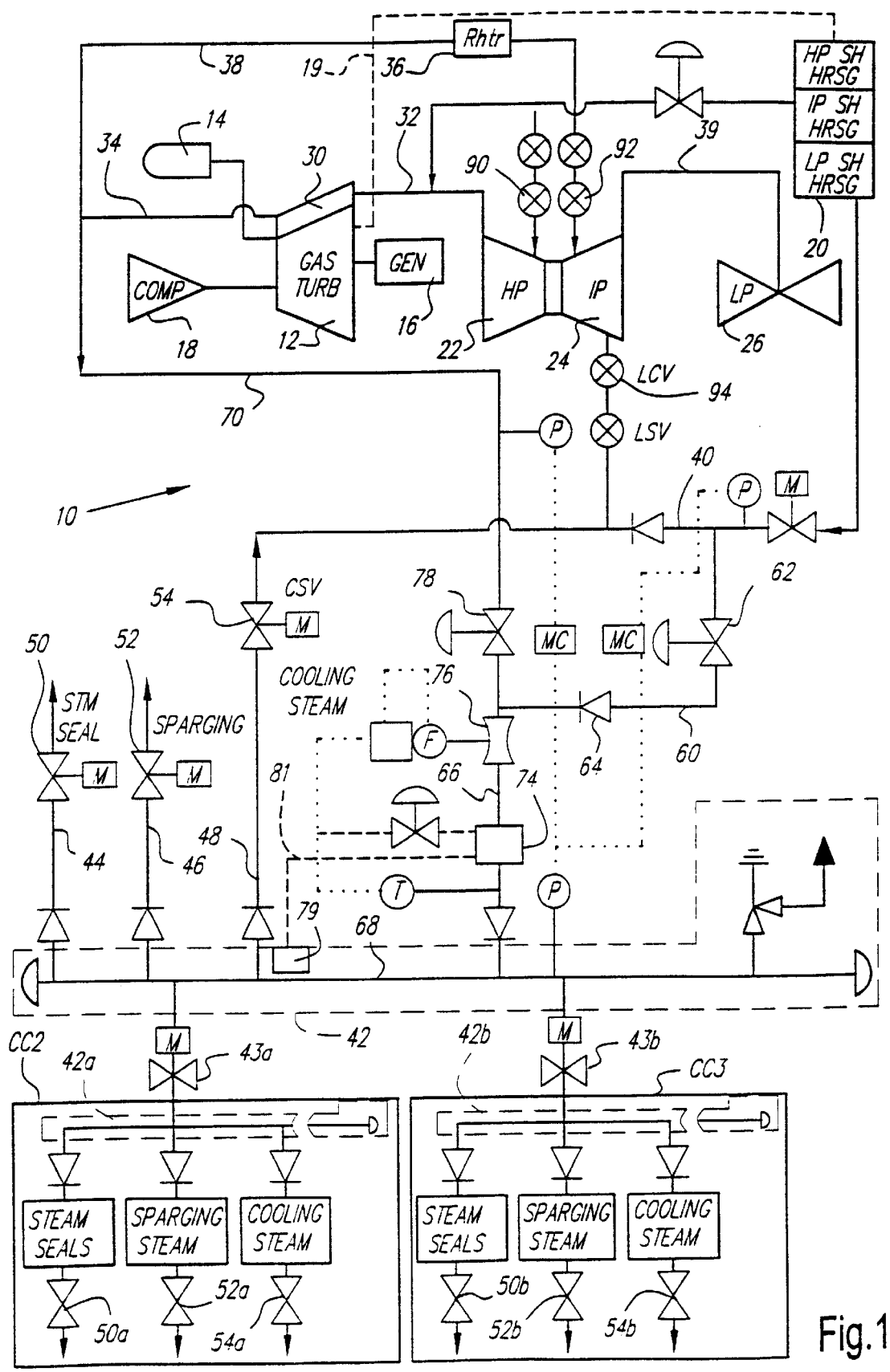
FIG. 1 is a schematic illustration of an apparatus for supplying auxiliary steam in a combined cycle system in accordance with the present invention.

Referring to the single drawing figure, there is illustrated a combined cycle system, generally designated 10, which employs a gas turbine 12 for combusting a fuel/air mixture in a combustor 14 and supplying the hot gases of combustion to turn the turbine and generate work, for example, to drive a generator 16 for the production of electricity. The turbine, of course, has a compressor 18 for supplying compressed air as is conventional. In a combined cycle system, the hot gases of combustion exhausting from the gas turbine exhaust, as illustrated by the dashed line 19, to a heat recovery steam generator (HRSG) 20 in which water is converted to steam in the manner of a boiler. The steam thus produced drives a steam turbine, in this case represented by high pressure, intermediate pressure and low pressure turbines 22, 24 and 26, respectively, where additional work is extracted to also drive the generator or a second generator, not shown, for producing electricity.

A heat recovery steam generator typically comprises HP, IP and LP evaporators, as well as various heaters, i.e., economizers and superheaters, generally referred to as heaters, whereby the exhaust gases from the gas turbine at high temperature convert the water in the HRSG to steam for use in driving the steam turbine. When there are multiple combined cycle systems in a plant, steam is also commonly extracted for use in other combined cycle systems, for example, starting the steam turbines whereby auxiliary steam is supplied to the steam seals and sparging devices of additional steam turbines. The HRSG, therefore, under normal operating conditions supplies low pressure, intermediate pressure and high pressure steam to the LP, IP and HP steam turbines via suitable piping arrangements, not all of which are shown.

In advanced gas turbine design, however, the gas turbine 12 is steam cooled and most steam from the high pressure steam turbine is normally supplied to a cooling steam circuit 30 of the gas turbine via piping 32 from the high pressure steam turbine 22. As will be appreciated from the drawing figure, the spent cooling steam exhausted from the gas turbine 12 via line 34 is normally supplied a reheater 36 via line 38 for use in the intermediate pressure turbine 24. Steam exhausting the intermediate pressure turbine 24 is supplied the low pressure turbine 26 via line 39. Steam from the low pressure superheater portion of the HRSG 20 is supplied via line 40 to the intermediate turbine 24. Thus, in normal operation of the combined cycle system, high pressure superheated steam is normally supplied the high pressure turbine 22 via valve 90 from the high pressure superheater, not shown, of the HRSG 20 for driving the high pressure steam turbine. Most of the steam exhausting from the high pressure turbine 22 is supplied to the gas turbine steam cooling circuit 30 for cooling the gas turbine. The spent cooling steam is supplied via reheater 36 to the intermediate pressure turbine 24 which, in turn, supplies steam to the low pressure turbine 26 via line 39.

Each combined cycle system 10, CC2, CC3, etc. includes a unit header 42, 42a, 42b (42a and 42b are not completely shown), etc. Connected to each header, for example, a host header 42 via piping 44, 46 and 48 are a steam seal valve 50, a sparging valve 52 and a cooling steam valve 54 (for a common GT/ST generator application). The steam seal valve 50 couples the piping 44 to the steam seals of the steam turbine. The steam valve 52 couples the steam of the header 42 to a sparging device for the condensor. Finally, the valve 54 couples the steam in the header 42 to a steam cooling circuit for the steam turbine for use during startup when a common generator is used for the gas turbine and steam turbine.

The following description of the combined cycle system 10 is considered as a description of the additional systems CC2, CC3, etc., which are identical to combined cycle system 10. As illustrated, low pressure steam from the HRSG superheater is provided via line 40 to the intermediate pressure turbine 24. To extract auxiliary steam from the combined cycle system, and supply auxiliary steam to the header 42, or to the headers 42a and 42b of systems CC2 and CC3, respectively, a conduit 60 lies in communication with conduit 40 through a pressure control valve 62. Conduit 60 also lies in communication through a check valve 64 with a conduit 66 in communication with a conduit 68 for directly supplying auxiliary steam to the header 42. During normal operation, the control valve 62 is closed whereby steam flows from the HRSG 20 via conduit 40 to the intermediate turbine 24. The steam flowing in the low pressure conduit 40 has a pressure level which is suitable for a header system design. The steam flowing in the low pressure conduit 40 has a temperature which generally meets the auxiliary steam use temperature requirements for starting additional combined cycle units and does not require cooling by attemperation. However, the low pressure supply system may not have adequate capacity to meet all of the auxiliary steam supply requirements. Consequently, the auxiliary steam supplied from the low pressure superheater of the HRSG 20 may be supplemented by a high pressure auxiliary steam source.

To accomplish this, a conduit 70 is coupled to the conduit 34 of the steam cooling circuit downstream of the gas turbine 12 and upstream of the reheater 36 for combining the spent cooling steam from the gas turbine from conduit 34 with the low pressure steam flowing via line 60. Thus, the low pressure steam in first conduit 60 is supplemented with the high pressure steam in second conduit 70 for flow in the third conduit 66. Because the high pressure steam supply temperature is too high for auxiliary use during starting, and the temperature of the high pressure auxiliary steam flowing in line 70 is too hot for auxiliary use purposes, a temperature reduction to the steam use temperature is necessary. To reduce the temperature of the supplementary steam for the off-line units, e.g., CC2 or CC3, a water attemperator 74 is provided in the third conduit 66. A water attemperator is used because a suitable steam attemperator source is not available with steam-cooled gas turbine combined cycle systems. A flow nozzle 76 for measuring the flow in third conduit 66 is also provided. The attemperator 74 is responsive to a predetermined minimum measured flow in conduit 66 and a predetermined temperature of the steam in header 42 to effect cooling of the auxiliary steam flowing in line 66. That is, the attemperator is not turned on until a minimum flow through nozzle 76 and a predetermined temperature in header 42 are established. The low pressure flowing from conduit 60 establishes the necessary minimum flow. The flow through the conduit 70 prior to combining in conduit 66 with the flow through first conduit 60 from the low pressure source is controlled by a high pressure control valve 78. High pressure valve 78 is controlled to open at a slightly lower set point than the set point for the low pressure control valve 62. A thermocouple 79 measures the steam temperature in header 42 and provides a signal via line 81 to the attemperator should the steam temperature in header 42 exceed a predetermined temperature.

It is essential that the steam cooling of the gas turbine be maintained at all times. Thus, to maintain pressure at the inlet to the gas turbine cooling system when extracting steam from the reheat system, the intercept control valves 78 and 62 are responsive to the pressure in the header 42.

In operation, and to start, for example, off-line unit CC2 using auxiliary steam from a host unit 10, the host unit 10 is presumed operating at a suitable load. Where the units to be started are in a warm or hot condition, it is usually not necessary to attemperate the low pressure steam supply when supplying auxiliary steam. For starting unit CC2, the low pressure valve 62 is opened to prewarm the header system 42 and valve 43a is opened to prewarm header 42a. Sealing steam to CC2 is initiated by opening steam seal valve 50a. The host unit 10 low pressure control valve 62 will respond to provide the additional flow. Similarly, as the sparging valve 43a is opened to provide sparging steam for starting unit CC2, low pressure control valve 62 responds by providing additional low pressure steam. The low pressure steam does not need to be attemperated and establishes a minimum flow requirement for attemperation if and when needed. As CC2 steam use continues, such as opening steam cooling valve 54, on a unit with a common generator for the gas and steam turbine, or as CC3 unit is brought on-line, all of the low pressure steam flow will ultimately be utilized. The additional steam flow required is provided from conduit 70 by opening high pressure control valve 78. The high pressure steam temperature is too hot for the steam uses and is cooled by the attemperator 66 by measuring the header temperature using thermocouple 79. Water attemperation of the high temperature steam is acceptable because the low pressure flow has established the minimum flow requirement to ensure adequate mixing of steam and water. Control valve 78 provide the necessary additional steam flow as needed.

For starting a cold unit, the temperature of the low pressure steam may be too hot for the starting unit's steam seals. In this case the low pressure steam also needs to be cooled. Cooling of the low pressure steam is accomplished by opening the host unit's sparging valve 52 and admitting steam flow to the condenser. This will establish a minimum flow in the attemperator to ensure adequate steam to water mixing. Once this steam flow has been established, the low pressure steam can be attemperated to the proper temperature and the steam seal valve 50a of the starting unit can then be opened. Sparging valve 52a of the starting unit can then also be opened establishing additional steam flow through the host unit attemperator. Once the minimum flow in the attemperator has been established, the host unit's sparging valve 46 can be closed and the use of the auxiliary steam system continues in the normal manner.

The high pressure control valve 78 is reduced and closed when the steam demand is reduced. The low pressure control valve 62 provides steam without attemperation. As the steam demand for the additional unit CC2 reduces, the low pressure control valve is closed. The additional unit CC3 may be similarly started using auxiliary steam from the host unit 10 or from the second unit CC2 in a similar manner.

The host unit and one or more of the additional units may operate continuously at full speed no-load (FSNL) after a load rejection to provide steam for sealing and steam turbine cooling for a single-shaft system. With respect to unit 10, at FSNL after a load rejection, the steam turbine main control and reheat intercept valves 90 and 92 are closed and cooling steam is admitted, using the low pressure admission valve 94 to prevent overheating. The source of steam is the low pressure conduit 40 from the HRSG. If the amount of low pressure steam via conduit 40 is insufficient, low pressure steam can be admitted to the header 42 through valve 62 with the cooling steam valve 54 open and the high pressure steam system used to supplement the low pressure steam. For steam seal supply, at FSNL after a load rejection, intermediate pressure steam for sealing steam may be used.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for supplying auxiliary steam to an end user comprising:
   a combined cycle system including a steam-cooled gas turbine, a steam turbine and a heat recovery steam generator in heat transfer relation with hot products of combustion from said gas turbine, said heat recovery steam generator including a low pressure heater for generating steam and driving said steam turbine;
   a reheater for flowing spent cooling steam from said gas turbine to said steam turbine;
   a low pressure control valve for diverting at least a portion of the low pressure steam generated by the low pressure heater for flow through a first conduit for auxiliary steam use;
   a high pressure control valve for diverting at least a portion of the spent high pressure cooling steam from said gas turbine for flow thereof through a second conduit;
   a third conduit for receiving the low pressure and high pressure steam flows of said first and second conduits, respectively, and defining an auxiliary steam conduit for flow thereof to an end user; and
   a water attemperator in said third conduit for controlling the temperature of the auxiliary steam.

2. Apparatus according to claim 1 including a measuring device for measuring flow of steam in said third conduit, said attemperator being activated in response to a measurement of a predetermined steam flow in said third conduit provided by the steam flowing through said first conduit into said third conduit.

3. Apparatus according to claim 1 including a second combined cycle system including a second gas turbine, a second steam turbine and a second heat recovery steam generator in heat transfer relation with hot products of combustion from said second gas turbine for generating steam for the second steam turbine, steam seals in said second combined cycle system for the second steam turbine and a fourth conduit for connecting the third conduit to said steam seals.

4. Apparatus according to claim 1 including a second combined cycle system having a second gas turbine, a second steam turbine and a second heat recovery steam generator in heat transfer relation with hot products of combustion from said second gas turbine for generating steam for the second steam turbine, a steam sparger in said second combined cycle system for sparging water in a condenser of the second steam turbine and a fourth conduit for connecting the third conduit to said sparging device.

5. Apparatus according to claim 1 including a second combined cycle system including a second gas turbine, a second steam turbine and a second heat recovery steam generator in heat transfer relation with hot products of combustion from said second gas turbine for generating steam for the second steam turbine, a steam cooling circuit for the second steam turbine and a fourth conduit for connecting the third conduit to said steam cooling circuit.

6. In a combined cycle system having a steam cooled gas turbine, a steam turbine and heat recovery steam generator in heat transfer relation with hot products of combustion from said gas turbine and including a heater for generating steam and driving the steam turbine, a method of generating auxiliary steam for use by an end user, comprising the steps of:
   diverting at least a portion of the steam generated by the heater supplied to said steam turbine for flow through a first conduit;
   diverting at least a portion of the spent cooling steam from said gas turbine for flow through a second conduit;
   combining the steam flows through the first and second conduits in a third conduit for flowing auxiliary steam to an end user; and
   reducing the temperature of the steam in said third conduit.

7. A method according to claim 6 including reducing the temperature of the steam in said third conduit in response at least in part to a predetermined flow of steam in said third conduit.

8. A method according to claim 6 including reducing the temperature of the steam in said third conduit in response, at least in part, to a predetermined temperature of the steam in said third conduit.

9. A method according to claim 6 including reducing the temperature of the steam in said third conduit in response to a predetermined flow of steam and the temperature of the steam in the third conduit.

10. A method according to claim 6 including a second steam turbine having seals, and flowing the auxiliary steam in said third conduit to said steam seals prior to start-up of said second steam turbine.

11. A method according to claim 6 including a second steam turbine and a condenser, and flowing the auxiliary steam in said third conduit to said condenser for use as sparging steam.

12. A method according to claim 6 including a second steam turbine having a steam cooling circuit, and flowing the auxiliary steam in said third conduit to said steam cooling circuit for cooling said second steam turbine at startup thereof.

* * * * *